UNITED STATES PATENT OFFICE.

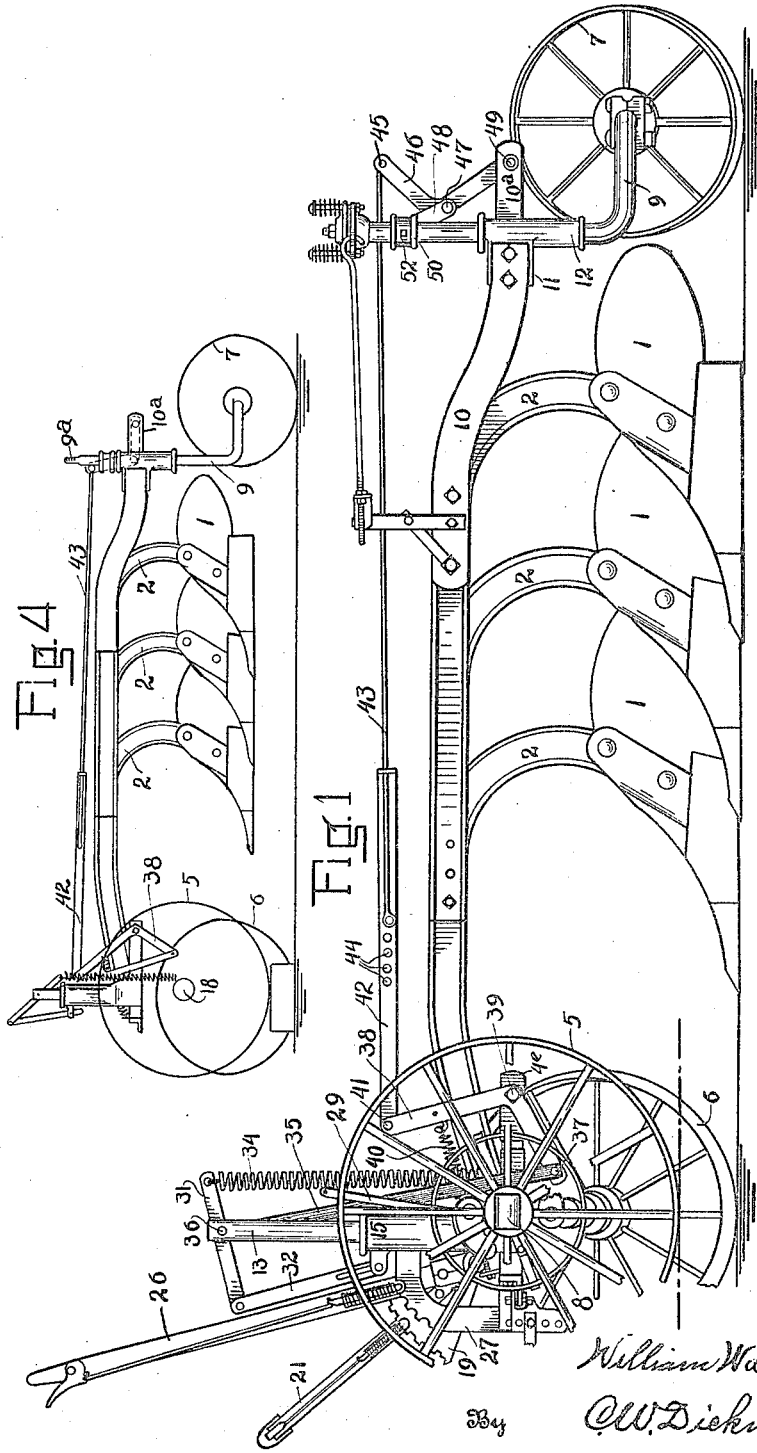

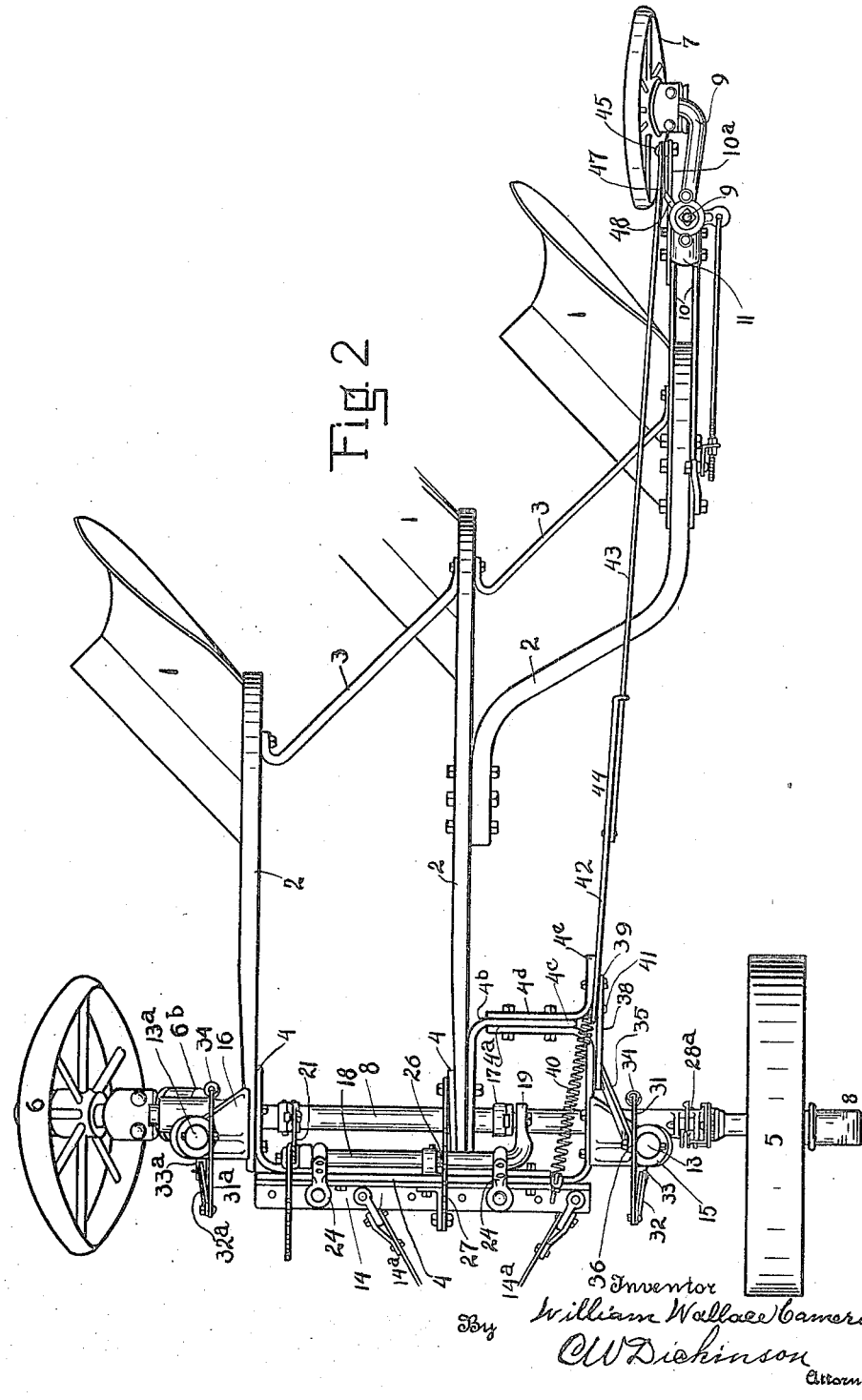

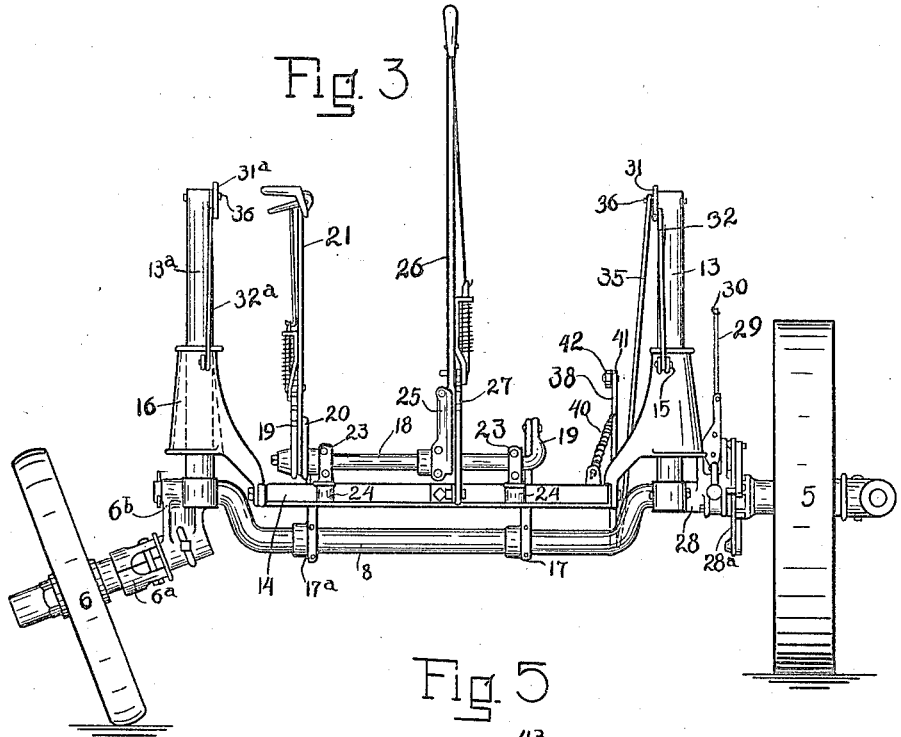
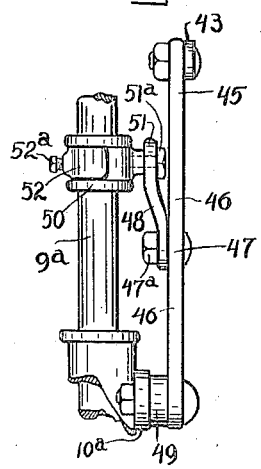

WILLIAM WALLACE CAMERON, OF LA CROSSE, WISCONSIN, ASSIGNOR TO LA CROSSE PLOW COMPANY, OF LA CROSSE, WISCONSIN.

PLOW.

1,301,539.      Specification of Letters Patent.      Patented Apr. 22, 1919.

Application filed July 2, 1917. Serial No. 178,255.

*To all whom it may concern:*

Be it known that I, WILLIAM WALLACE CAMERON, a citizen of the United States of America, residing at 1008 Rose street, in the city of La Crosse, County of La Crosse, and State of Wisconsin, have invented certain new and useful Improvements in Plows, of which the following is a specification, reference being had to the accompanying drawings, which are made a part hereof.

The invention relates to wheeled plows, and more especially to means for raising and lowering the rear end of a plow carrying structure, simultaneously with the raising of the front end of the structure, that is carried on sustaining wheels, and of the character shown and described in my application for improvements in plows filed in the Patent Office February 27, 1917, Serial No. 151,347.

The object of the invention is to provide improved means for raising and lowering a plow carrying structure, whereby the forward end of the structure shall, by the raising and lowering of the structure caused by the mechanism provided for that purpose, cause the rear end of the structure to be raised and lowered simultaneously therewith.

In such means the rear shifting mechanism is not connected directly to the means for shifting the front end of the structure to be operated directly thereby, but is connected to the front end of the plow carrying structure itself, to be operated thereby, the front end of the structure being raised and lowered by its shifting mechanism, and the front end of the plow carrying structure operates the mechanism for shifting its rear end.

In the drawings, Figure 1 is a side elevation of a plow embodying my improved rear shifting means, taken from the landside of the plow, and showing the plow in lowered or working position; Fig. 2 is a plan of the plow, looking downward; Fig. 3 is a front elevation, the plows and the rear wheel being omitted; Fig. 4 is a skeleton of the same side elevation as is shown in Fig. 1, but showing the plows in raised position; Fig. 5 is a detail of a rear view of the plow showing the shifting connection between the rear of the plow carrying structure and the rear wheel.

In the drawings, 1 indicates plow bottoms, attached to ordinary plow beams, 2, which in this case are connected together by brace bars 3 in the rear, and the U brace 4 at the front, to form a rigid gang of furrow openers; 4$^a$, 4$^b$, 4$^c$ and 4$^d$ are various parts forming an extension bracket attached to the front end of the plow carrying structure just described, for supporting the connections with one side of the plow carrying structure and the supporting structure described below.

5 is the land wheel, running on the unplowed ground, 6 is the front furrow wheel, 7 is the rear sustaining wheel. 6$^a$ is a stub axle on which the wheel 6 revolves, and having a vertical portion 6$^b$, in which one end of the crank axle 8 is rotatively supported. The opposite end of the axle 8 is sustained in the hub of the land wheel 5. 9 is the axle for the rear wheel, and has a vertical portion 9$^a$, rotatively mounted in the vertical boxing 12, for swiveling laterally, the boxing 12 being rigidly connected to the rear of the plow beams by the lug 11 on the boxing, to the extension 10$^a$ secured to the plow beam on the landside of the plow carrying structure, and in such a way that the wheel 7 travels directly behind the rear plow bottom and in the furrow cut by it when the plows are at work.

Figs. 1 and 2 show means at the top of the axle 9 for controlling the swiveling of the rear wheel 7, but those means are no part of the invention herein set out, and are not further described.

28 is a member that is supported upon and loosely mounted on the axle 8 toward its landside end, 28$^a$ shows a power-operated means for rotating the crank axle 8 to shift the plow carrying structure vertically at its front end, it being intermittently connected with the rotating wheel for that purpose; 29 and 30 are a lever and cord for controlling the action of said power operated shifting mechanism by the operator. This shifting mechanism is more fully set out and claimed in the application above mentioned, and is not a part of the invention set out herein.

13 and 13$^a$ are vertical posts rigidly secured to the parts 6$^a$ and 28. The wheels 5 and 6, the parts 6$^a$ and 6$^b$, the axle 8, member 28 and the posts 13 and 13$^a$ form a supporting structure upon which the forward end of the plow carrying structure is carried. 14 is a clevis bar secured across the front end of the plow carrying structure, for attachment to draft means, such as a traction engine, by means of the draft rods 14ª. 15 and 16 are vertical slides rigidly secured to the front of the plow carrying structure at its respective sides, encircling the posts 13 and 13ª to vertically slide thereon. 17 and 17ª are links pivotally mounted on the axle 8, 17 being pivotally connected to the free end of the crank arm 19 on a shaft 18 rotatively mounted by the ends 23—23 on the clips 24—24 rigidly supported on the clevis 14 of the plow carrying structure; 17ª being connected to the short end 20 of the bell crank lever 21 that is loosely mounted on the shaft 18, whereby the furrow side of the plow carrying structure may be vertically shifted with respect to the opposite side. 19 is a ratchet rigidly secured to the shaft 18 for locking the lever 21 in adjusted positions with respect to the shaft 18, whereby that side of the plow is held in adjusted relations with respect to the supporting structure.

25 is a socket member, rigidly mounted on the shaft 18, and forms a part of the hand lift lever 26, to which it is rigidly secured, for rotating the shaft 18 to vertically shift the same, and by its connections through the ratchet 19, lever 20—21, and the links 17 and 17ª, raising both sides of the plow carrying structure bodily and simultaneously with respect to the supporting structure. The ratchet 27 is rigidly secured to the plow carrying structure, concentric with the shaft 18, for locking the lever 26 in adjusted positions, and with it, the relation of the plow carrying structure to the supporting structure as shifted by hand. The arrangement of the power operated shifting means and the hand operated shifting means is such that the power operated means will operate the hand shifting means to raise and lower the plow carrying structure, and the hand shifting means may be operated independently of the power operated means to impart a limited amount of movement to the plow carrying structure; and one side of the latter structure may be shifted vertically with respect to the other side independently of either the hand shifting means and of the power operated means.

Secured by the pivots 36 to the posts 13 and 13ª are the horizontal rocking-bars 31—31ª, pivotally connected at one of their ends to the respective links 32—32ª, which are pivotally secured to the slides 15—16, and at their other ends to the easing springs 34, the lower ends of which are secured to the supporting structure.

Secured at its upper end on the pivot 36 on post 13 is a swinging strap or bracket 35, which at its free end is pivotally secured to the free end 37 of the lower leg of a bell crank 38, which is centrally pivoted, at 39, to the rear end of the bar 4ᵉ of the plow carrying structure. The free end 41 of the upper leg of the bell crank is pivotally secured to the forward end of a connecting rod 42—43, which intermediate its ends is provided with longitudinal adjustments 44. The rear end of the rod is pivotally secured to the free end, 45, of the upper leg of the bell crank 46, which is pivotally carried at its apex 47 to the lower end of the swinging strap or bracket 48. The free end of the lower leg of the crank 46 is pivotally secured at 49 to the rear end of the rearwardly projecting strap 10ª, that is rigidly secured to the socket 11—12, to which the bar 10 of the plow carrying structure is rigidly attached. The upper end of the swinging strap 48 is pivotally secured to the projecting pivot 51ª on the collar 50, that is loosely mounted on the vertical portion 9ª of the rear axle, supported in the rear wheel. A nut holds the strap 48 on the pivot 51ª. The collar 50 has upper and lower members that encircle the axle loosely, between which is inserted the collar 52, to also encircle the shank 9ª, and is held in vertically adjusted positions on the shank by the set screw 52ª. By means of the collars 50—52 the rear end of the plow carrying structure may be held in vertically adjusted positions with respect to the wheel 7, to regulate the suction of the plow, but without interfering with the lateral swivel of the wheel in the collar 50.

In operation, with the front shifting mechanism referred to, if the plows are at work in the ground, and it is desired to raise the plows therefrom, the operator, who may be standing on a tractor engine, pulling the machine, pulls the cord 30, which moves the lever 29 to set in motion the power operated front shifting mechanism, which will cause the axle 8 to rotate in its bearings in the members 6ᵇ and 28 and thereby, through the links 17—17ª, vertically shift the front end of the plow carrying structure. It is manifest that, inasmuch as the bell crank 38 is fixed at 39 to the member 4ᵉ of the plow carrying structure, and the upper end of the strap 35 is in permanently fixed vertical relation to the supporting structure, as the member 4ᵉ rises with the supporting structure, the rise of the plow will cause the bell crank 38 to rotate on its pivot at 39, and thereby move the free end 41 of its upper arm forwardly, drawing with it the rod 42—43; and that the forward movement of the rod will draw forwardly the upper arm of the bell crank 46, at the rear of the plow carrying structure, thus causing the bell crank to rotate on its pivot 47, and throw the free end of its lower arm upwardly, and with it the extension 10ª, the box 11—12 and 13ᶜ the rear end of the plow carrying structure; and it is evident that this upward movement of the rear end of that structure will automatically occur with the movement of the front end of the structure.

In the application aforesaid are shown and described means for locking the axle 8 and plow carrying structure in their raised and lowered positions. Inasmuch as the front end of the plow carrying structure will be locked in such opposite positions, it is manifest that the rear end of the structure will also be locked in its raised position. Should it be desired to lower the plows to working position, the operator pulls the cord again, whereby the front shifting mechanism is again set in motion to permit of the lowering of the plows at the front end, and in its descent the front end of the structure will operate the bell crank 38 in the reverse direction, thereby shifting the rod 42 reversely, reversing the movement of the bell crank 46, and thus permitting the rear end of the structure to be lowered simultaneously with the lowering of the front end thereof. The locking mechanism above referred to will lock the structure in its lowered position and thereby also lock the rear end of the structure in its lowered position.

While I have shown and described a power operated mechanism for shifting the forward end of the plow carrying structure and locking mechanism therefor it is manifest that no particular form of power operated mechanism is necessary for the operation of the invention herein set forth, and that the invention can be used in connection with exclusively hand operated shifting mechanism for shifting the front end of the structure, inasmuch as, whatever front shifting means be employed, the rise and fall of the front end of the plow carrying structure will operate the mechanism for shifting the rear end thereof.

It is to be noted that the straps 35 and 48 are pivotally supported to permit of the movement of the bell cranks to which they are connected; for, as the bell crank rotates on its pivot 39, the free end of the lower arm of the crank is drawn backwardly with respect to the arm 4ᵉ, which could not occur if that free end of the crank were rigidly secured to the supporting structure, because the front end of the plow carrying structure is fixedly secured in a fore and aft direction to the supporting structure by means of the slides 15—16 and the posts 13—13ᵃ. The same condition applies to the connection of the rear bell crank with its supporting strap with respect to the axle 9ᵃ.

Quite a little variation from the precise form in which the invention is shown might be employed without departing from the scope of the invention.

Having now shown and described my invention, what I claim is:

1. In a plow, the combination of a supporting structure, a plow carrying structure, a shifting connection between the two structures, means for operating the connection, a rear carrying wheel, shifting means between the rear of the plow carrying structure and the rear wheel, and a connection between the supporting structure and the rear shifting means comprising an arm pivoted on the front of and operated by the plow carrying structure and a rigid link, whereby the ends of the plow carrying structure are simultaneously shifted, and means for operating the latter connection.

2. In a plow, the combination of a supporting structure, a plow carrying structure, a shifting connection between the two structures, means for operating the connection, a rear carrying wheel, shifting means between the rear of the plow carrying structure and the rear wheel, a connection between the supporting structure and the rear shifting means comprising an arm pivoted on the front of and operated by the plow carrying structure and a rigid link pivoted thereon and to the rear shifting means, whereby the ends of the plow carrying structure will be simultaneously shifted, and means for locking the plow carrying structure in shifted positions.

3. In a plow, the combination of a supporting structure, a plow carrying structure, a shifting connection between the two structures, means for operating said connection, a rear carrying wheel, a shifting connection between the rear of the plow carrying structure and the rear wheel, a connection between the supporting structure and the rear shifting means comprising an arm pivoted on the front of and operated by the plow carrying structure and a rigid link, whereby both ends of the plow carrying structure are simultaneously shifted, means for locking the plow carrying structure in shifted positions, and manually operated controlling means for the lock.

4. In a plow, the combination of a supporting structure, a plow carrying structure, a shifting connection between the front end of the plow carrying structure and the supporting structure, means for operating the connection, a rear carrying wheel, shifting means between the rear of the plow carrying structure and the rear wheel, a connection between the supporting structure and the rear shifting means comprising a link pivoted on the supporting structure, a bell crank pivoted on the front of the plow carrying structure, one arm thereof being pivoted to the free end of the bracket and a rigid connection between the opposite arm of the bell crank and the rear shifting means, and means for operating the latter connection whereby the rear end of the structure will be shifted simultaneously with the shift of the front end.

5. In a plow, the combination of a supporting structure, a plow carrying structure, a shifting connection between the two structures, means for operating the connection, a rear carrying wheel, shifting means between the rear of the plow carrying structure and the rear wheel, and a connection between the supporting structure and the rear shifting means comprising an arm pivoted on the front of and operated by the front of the plow carrying structure and a rigid connection between the arm and the rear shifting means, whereby the ends of the plow carrying structure will be simultaneously shifted.

6. In a plow, the combination of a supporting structure, a plow carrying structure, a shifting connection between the two structures, means for operating the connection, a rear carrying wheel, shifting means between the rear of the plow carrying structure and the rear wheel, a connection between the supporting structure and the rear shifting means, comprising a rigid swinging link pivoted on the supporting structure, a bell crank pivoted on the plow carrying structure one arm of which is pivoted to said link, a rigid link connecting the other arm of the bell crank lever and the rear shifting means, the bell crank lever being operated by the plow carrying structure when the front end is shifted.

7. In a plow, the combination of a supporting structure, a plow carrying structure, a shifting connection between the two structures, for shifting the front end of the plow carrying structure, a rear wheel, means for positively raising and lowering the rear of the plow carrying structure comprising bell cranks pivoted at opposite ends of the carrying structure one of the bell cranks being connected to the rear wheel and the other to the supporting structure, a rigid connection between the cranks, and means for simultaneously operating the two shifting means comprising the front end of the plow carrying structure when the latter is shifted.

8. In a plow, the combination of a supporting structure, a plow carrying structure, a shifting connection between the structures for shifting the front end of the structure, means for operating the connection, a rear wheel, vertical posts sustained by the supporting structure and the rear wheel respectively, means for shifting the rear of the plow carrying structure with relation to the rear wheel comprising bell cranks pivotally mounted at the ends of said structure, flexible connections between the said posts and the respective bell cranks comprising straps pivoted at their upper ends to the upper parts of the posts and at their lower ends to the respective bell cranks, a pivotal connection between the rear crank and the rear post, and rigid connection between the two cranks, whereby the vertical shift of the front of the carrying structure will shift the rear of the structure simultaneously therewith.

WILLIAM WALLACE CAMERON.

Copies of this patent may be obtained for five cents each, by addressing the "Commissioner of Patents, Washington, D. C."